US009665764B2

(12) United States Patent
Baek

(10) Patent No.: US 9,665,764 B2
(45) Date of Patent: May 30, 2017

(54) MOBILE TERMINAL AND CONTROLLING METHOD THEREOF

(71) Applicant: LG ELECTRONICS INC., Seoul (KR)

(72) Inventor: Seungcheon Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 151 days.

(21) Appl. No.: 14/569,050

(22) Filed: Dec. 12, 2014

(65) Prior Publication Data

US 2015/0172560 A1 Jun. 18, 2015

(30) Foreign Application Priority Data

Dec. 12, 2013 (KR) .......................... 10-2013-0154534

(51) Int. Cl.
*G06K 9/00* (2006.01)
*H04N 5/232* (2006.01)
*H04N 5/272* (2006.01)
*H04N 5/262* (2006.01)

(52) U.S. Cl.
CPC ..... *G06K 9/00228* (2013.01); *H04N 5/23216* (2013.01); *H04N 5/23219* (2013.01); *H04N 5/23293* (2013.01); *H04N 5/2621* (2013.01); *H04N 5/272* (2013.01)

(58) Field of Classification Search
CPC ........... G06K 9/00228; H04N 5/23216; H04N 5/2621; H04N 5/272; H04N 5/23219; H04N 5/23293
See application file for complete search history.

(56) References Cited

U.S. PATENT DOCUMENTS

| | | | | |
|---|---|---|---|---|
| 5,566,251 A * | 10/1996 | Hanna | .................... | H04N 5/272 348/588 |
| 5,913,088 A * | 6/1999 | Moghadam | ............ | G03B 15/08 396/2 |
| 5,914,748 A * | 6/1999 | Parulski | ................. | H04N 5/272 348/239 |
| 7,221,395 B2 * | 5/2007 | Kinjo | ................... | H04N 1/3872 348/239 |
| 7,423,671 B2 * | 9/2008 | Kiso | ..................... | H04N 1/387 348/218.1 |

(Continued)

*Primary Examiner* — Nhan T Tran
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. The present invention includes a display, a memory configured to store at least one image fragment, a $1^{st}$ camera, and a controller, if the $1^{st}$ camera is activated, displaying a preview screen of an image received from the $1^{st}$ camera, the controller controlling the display to display a prescribed one of the stored at least one image fragment on a prescribed region of the preview screen. Accordingly, when a photo is taken using a terminal, a photo-taker can be included in the taken photo in a manner of being synthesized with the corresponding photo.

12 Claims, 13 Drawing Sheets

(56) References Cited

U.S. PATENT DOCUMENTS

| | | | | |
|---|---|---|---|---|
| 7,656,429 B2* | 2/2010 | Larson | G06T 3/4038 | 348/208.14 |
| 7,876,334 B2* | 1/2011 | Bychkov | G06T 11/60 | 345/620 |
| 8,363,126 B2* | 1/2013 | Kurokawa | H04N 5/232 | 348/240.3 |
| 8,400,519 B2* | 3/2013 | Choi | G06K 9/00281 | 345/629 |
| 8,564,682 B2* | 10/2013 | Kim | G06T 7/0083 | 348/14.07 |
| 8,599,271 B2* | 12/2013 | Havens | H04N 5/2258 | 348/207.99 |
| 8,824,861 B2* | 9/2014 | Gentile | G06T 5/50 | 386/278 |
| 8,866,848 B2* | 10/2014 | Ishihara | G06T 15/503 | 345/619 |
| 8,953,079 B2* | 2/2015 | Raju | H04N 5/2624 | 348/14.02 |
| 8,976,255 B2* | 3/2015 | Matsuoto | H04N 5/2258 | 348/218.1 |
| 9,064,184 B2* | 6/2015 | Ruan | G06K 9/62 | |
| 9,167,147 B2* | 10/2015 | Plaehn | H04N 5/23212 | |
| 9,185,284 B2* | 11/2015 | Chao | H04N 5/23216 | |
| 9,253,434 B2* | 2/2016 | Boss | H04N 5/23229 | |
| 9,325,889 B2* | 4/2016 | Desai | H04N 5/2258 | |
| 9,325,903 B2* | 4/2016 | Kim | H04N 5/23293 | |
| 2003/0117501 A1* | 6/2003 | Shirakawa | H04N 5/2251 | 348/218.1 |
| 2005/0036044 A1* | 2/2005 | Funakura | G06K 9/00228 | 348/239 |
| 2005/0129324 A1* | 6/2005 | Lemke | H04N 1/387 | 382/254 |
| 2008/0174680 A1* | 7/2008 | Ogino | G11B 27/034 | 348/231.99 |
| 2009/0175609 A1* | 7/2009 | Tan | G03B 15/00 | 396/77 |
| 2010/0118175 A1* | 5/2010 | Bruce | H04N 5/23293 | 348/333.05 |
| 2010/0141784 A1* | 6/2010 | Yoo | H04N 5/23219 | 348/222.1 |
| 2011/0109763 A1* | 5/2011 | Han | G06T 11/60 | 348/222.1 |
| 2012/0008011 A1* | 1/2012 | Garcia Manchado | G03B 15/08 | 348/231.2 |
| 2012/0120186 A1* | 5/2012 | Diaz | H04N 5/2258 | 348/36 |
| 2012/0268552 A1* | 10/2012 | Choi | H04N 7/147 | 348/14.07 |
| 2012/0274813 A1* | 11/2012 | Ishibashi | H04N 5/232 | 348/239 |
| 2013/0038759 A1* | 2/2013 | Jo | H04N 5/2256 | 348/240.99 |
| 2013/0120602 A1* | 5/2013 | Huang | H04M 1/72522 | 348/218.1 |
| 2013/0235224 A1* | 9/2013 | Park | H04N 5/23222 | 348/218.1 |
| 2014/0118600 A1* | 5/2014 | Son | H04N 5/23293 | 348/333.11 |
| 2014/0232743 A1* | 8/2014 | Na | G09G 5/377 | 345/629 |
| 2014/0232904 A1* | 8/2014 | Na | H04N 5/23229 | 348/239 |
| 2015/0002633 A1* | 1/2015 | Hayashi | H04N 5/23293 | 348/46 |
| 2015/0049234 A1* | 2/2015 | Jung | H04N 5/2258 | 348/333.05 |

* cited by examiner

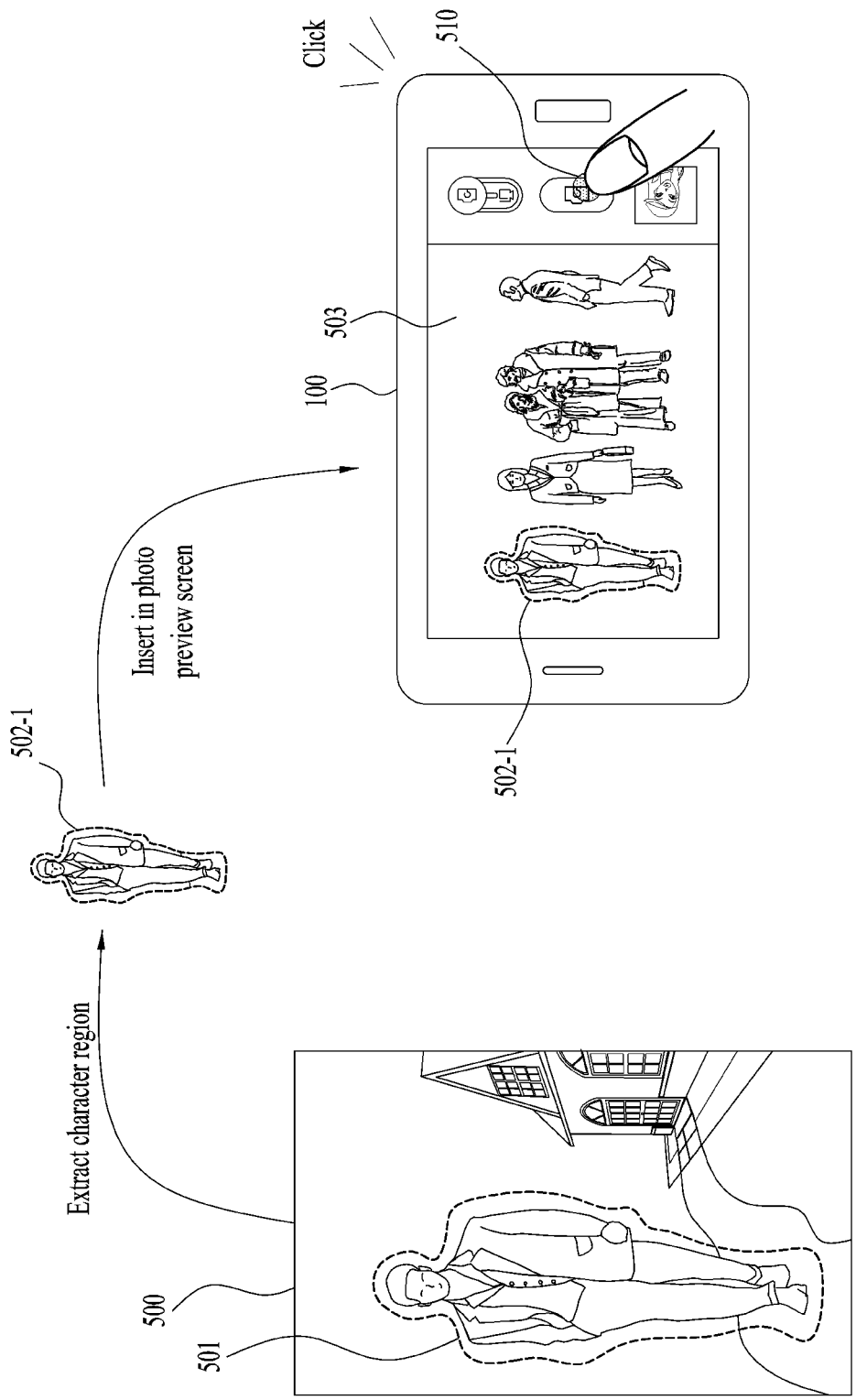
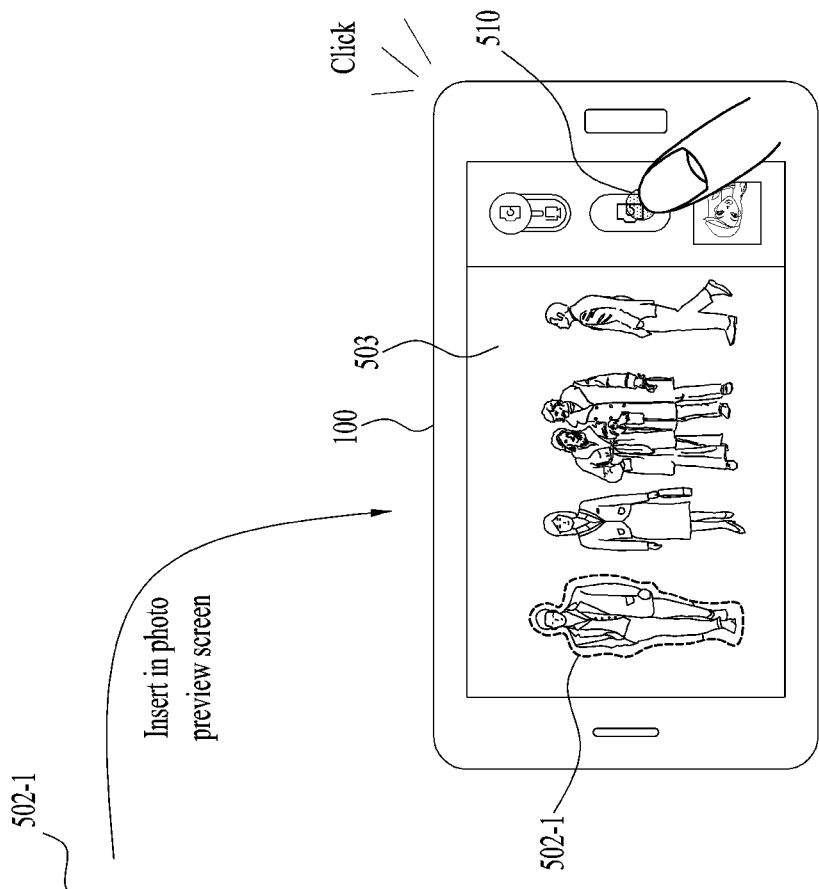
FIG. 5(a)
FIG. 5(b)

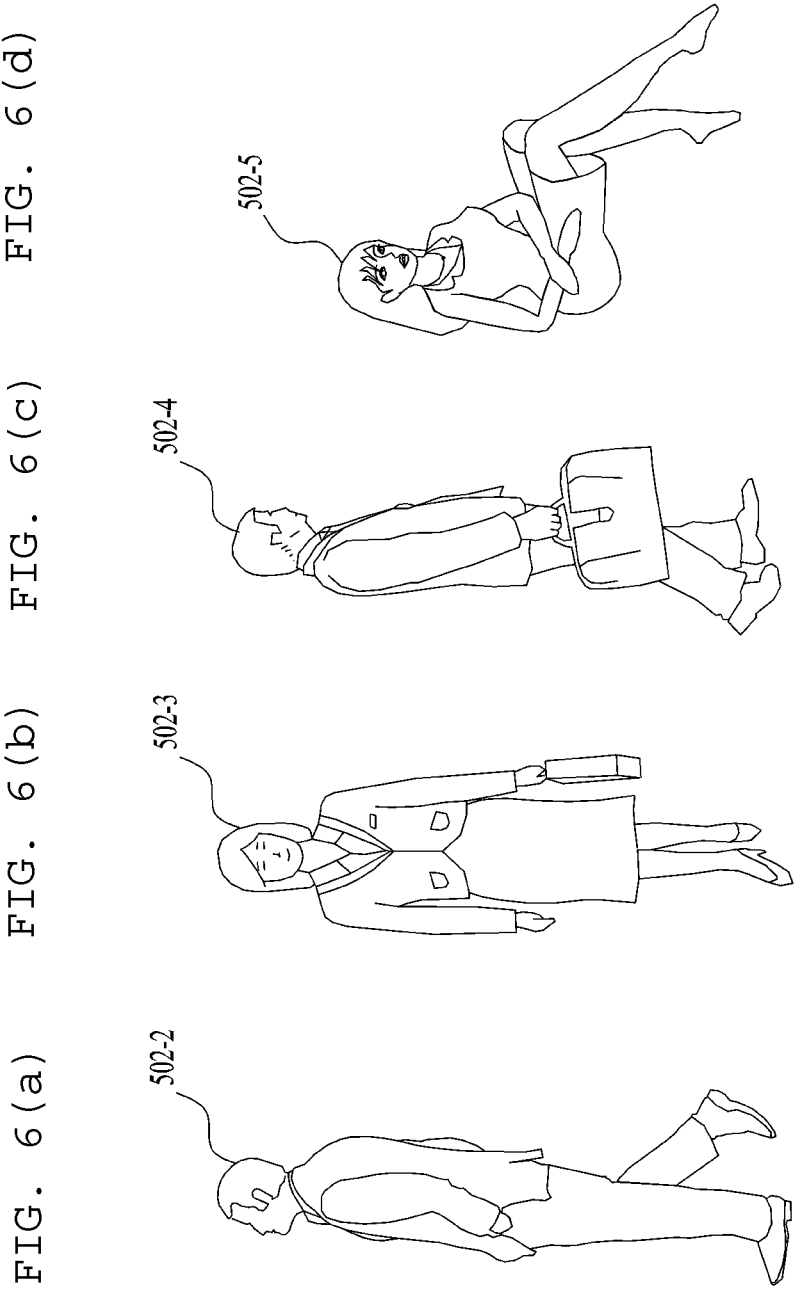

Character region/location (801') detection

Character region/location (801') detection

Character region/location (801') detection

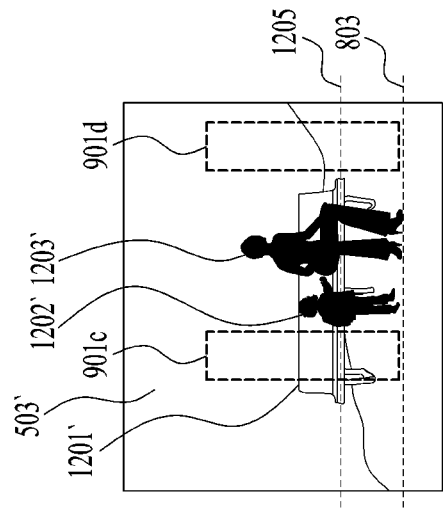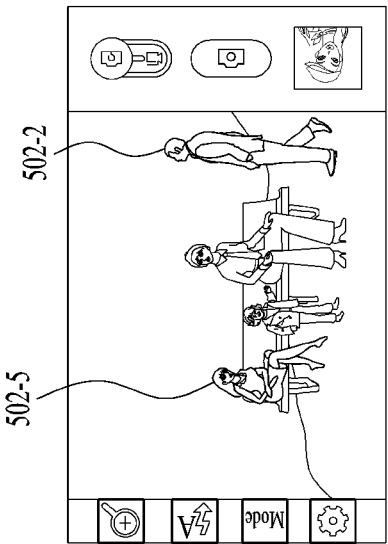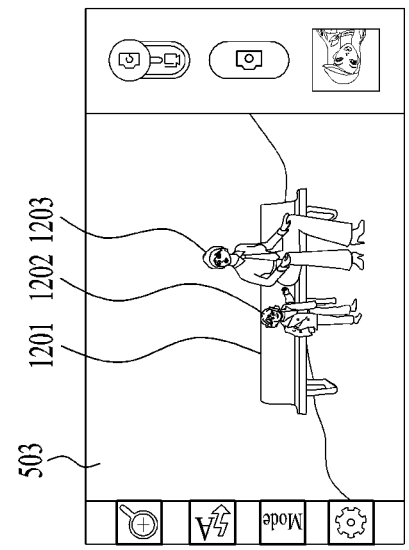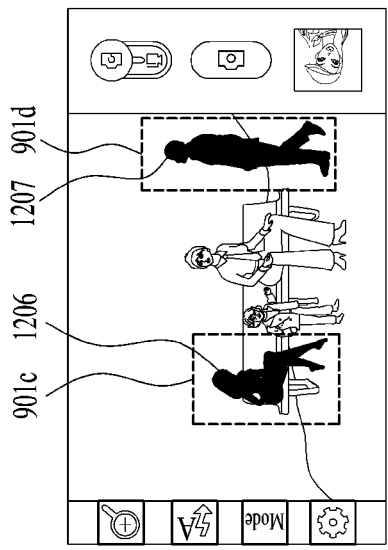
FIG. 12 (a) FIG. 12 (b) FIG. 12 (c) FIG. 12 (d)

FIG. 15 (a) 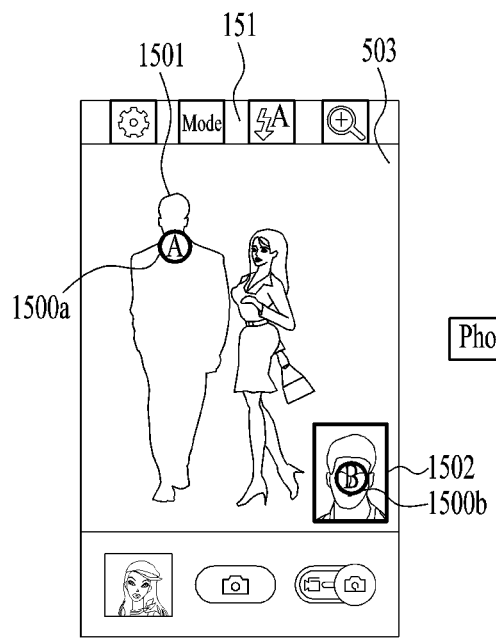 Photograph ➡ FIG. 15 (b) 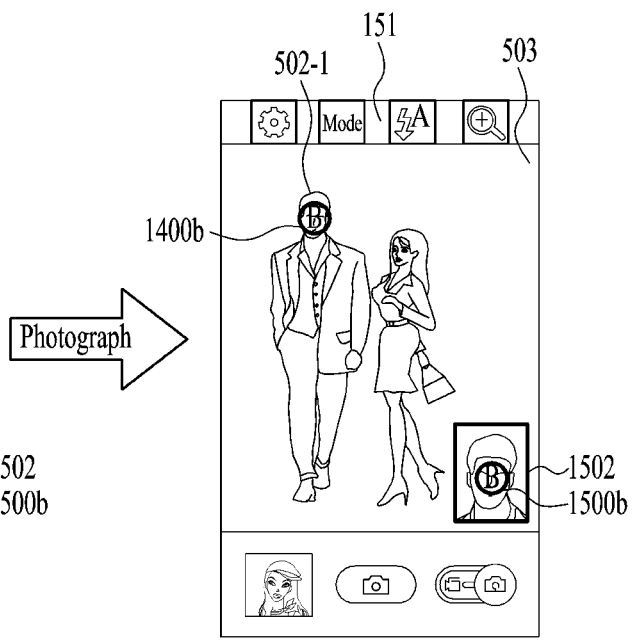

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2013-0154534, filed on Dec. 12, 2013, the contents of which are all hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

When a photo is taken using a terminal, it is unable to take the photo in which a person currently taking the photo is included. To solve this problem, various methods have been proposed. A most representative one of the various methods is a method of setting a self-timer built in a camera of a corresponding terminal. If a person currently taking a photo presses a shutter by fixing a terminal not to move, a photographing is performed after a lapse of a set self-timer time from a moment of pressing the shutter. Hence, the person currently taking the photo can be included in the corresponding photo.

However, it is advantageous for the self-timer setting method to fix a terminal to a prescribed location.

Thus, many ongoing efforts are made to research and develop a terminal and controlling method thereof to further enhance user's convenience in taking a photo including a person currently taking the photo.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a phototaker can be easily included in a photo currently taken.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a display, a memory configured to store at least one image fragment, a $1^{st}$ camera, and a controller, if the $1^{st}$ camera is activated, displaying a preview screen of an image received from the $1^{st}$ camera, the controller controlling the display to display a prescribed one of the stored at least one image fragment on a prescribed region of the preview screen.

In another aspect of the present invention, as embodied and broadly described herein, a method of controlling a mobile terminal according to the present invention may include the steps of if a $1^{st}$ camera is activated, displaying a preview screen of an image received from the $1^{st}$ camera on a display and further displaying a prescribed image fragment among saved at least one image fragment on a prescribed region of the preview screen displayed on the display.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures:

FIG. 5 (a) and FIG. 5 (b) are diagrams for the concept of performing a synthesis for facilitating an inclusion of a prescribed character in taking a photo according to one embodiment of the present invention;

FIG. 6 (a), FIG. 6 (b), FIG. 6 (c), and FIG. 6 (d) are diagrams for examples of a character template extracted from a previously saved photo according to one embodiment of the present invention;

FIG. 12 (*a*), FIG. 12 (*b*), FIG. 12 (*c*) and FIG. 12 (*d*) are diagrams for a controlling method of detecting a thing and/or a posture of a character on a preview screen and synthesizing a character template based on a result of the detection according to one embodiment of the present invention;

FIGS. 15 (*a*) and (*b*) are diagrams for the concept of a controlling method of further synthesizing a character template with a face look of a photo-taker according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
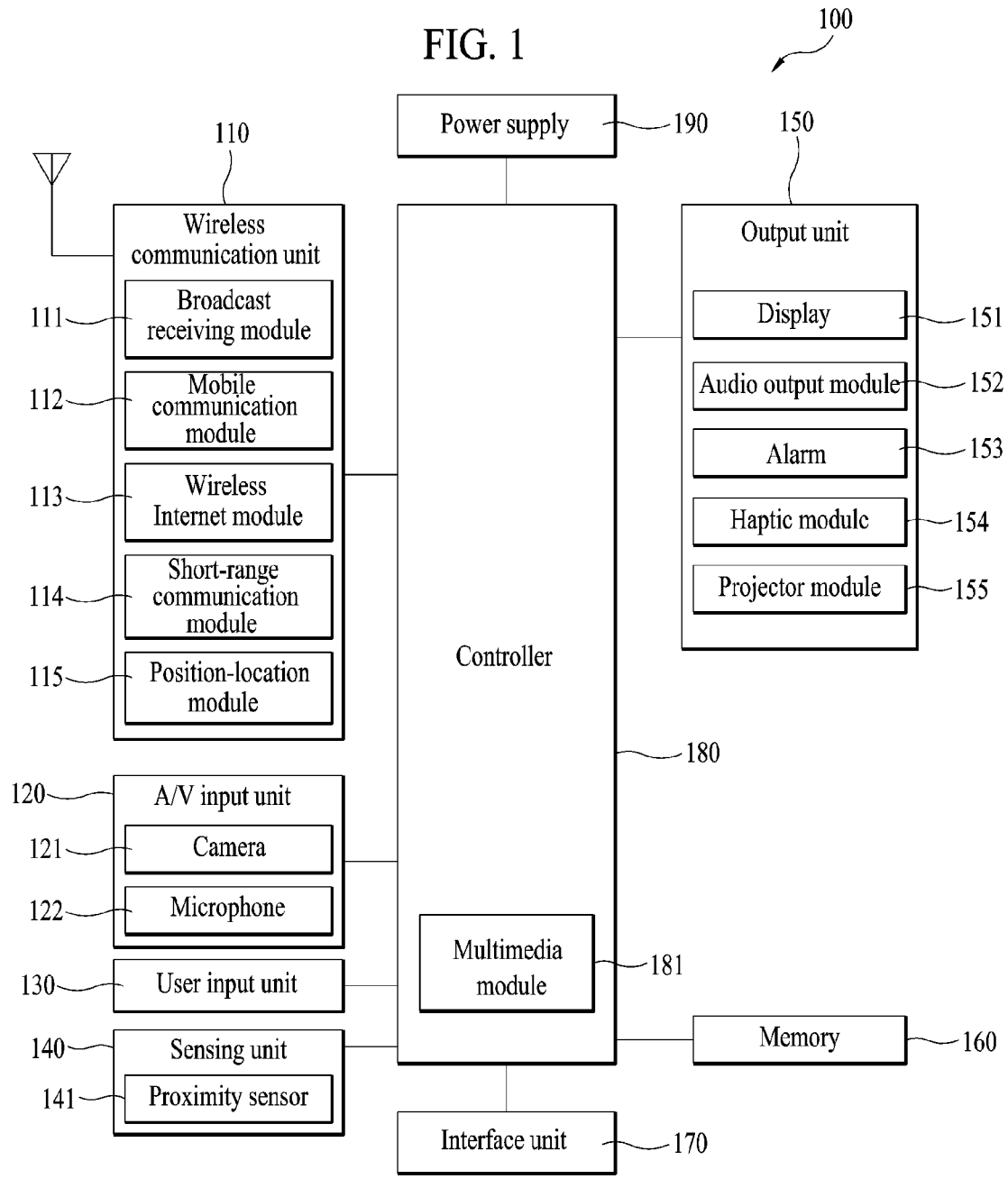
FIG. 1 is a block diagram of a mobile terminal according to one embodiment of the present invention.

FIG. 1 is a block diagram of a mobile terminal 100 in accordance with an embodiment of the present invention.

FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
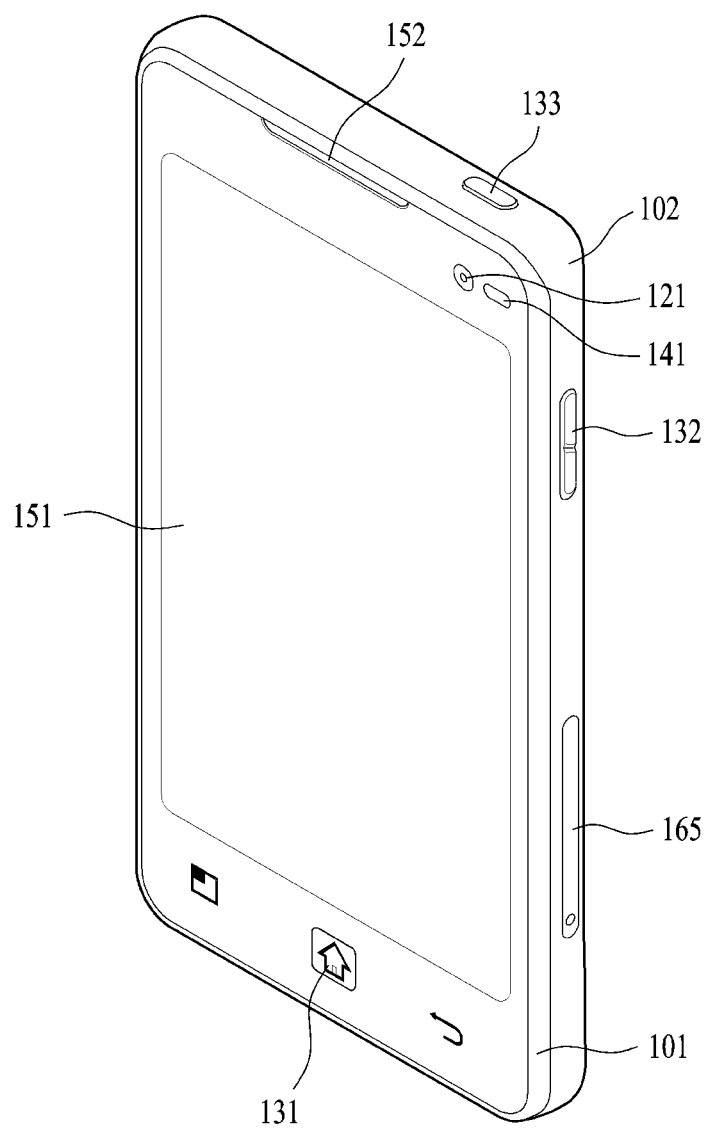
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132. A third manipulating unit 133 can also be provided to the mobile terminal 100, as shown in FIG. 2.

Figure 3:
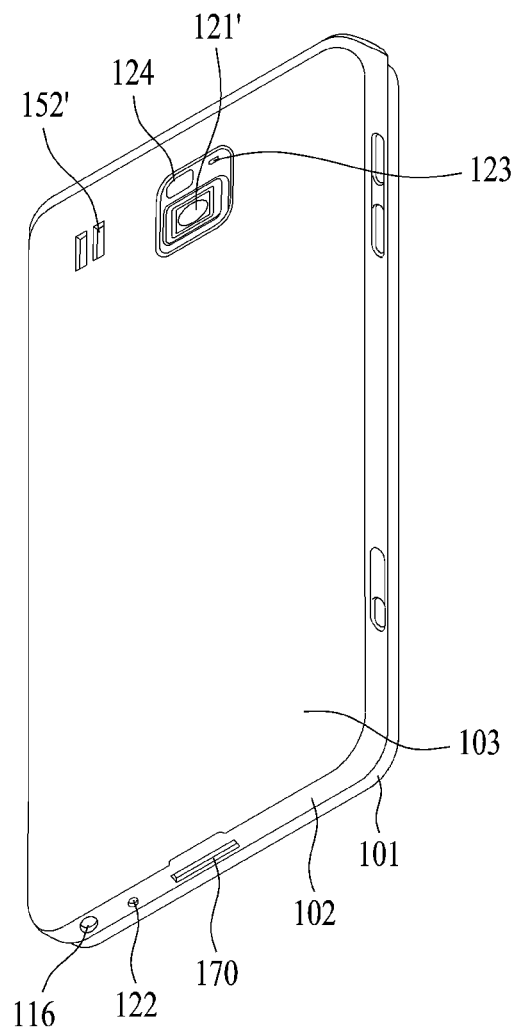
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
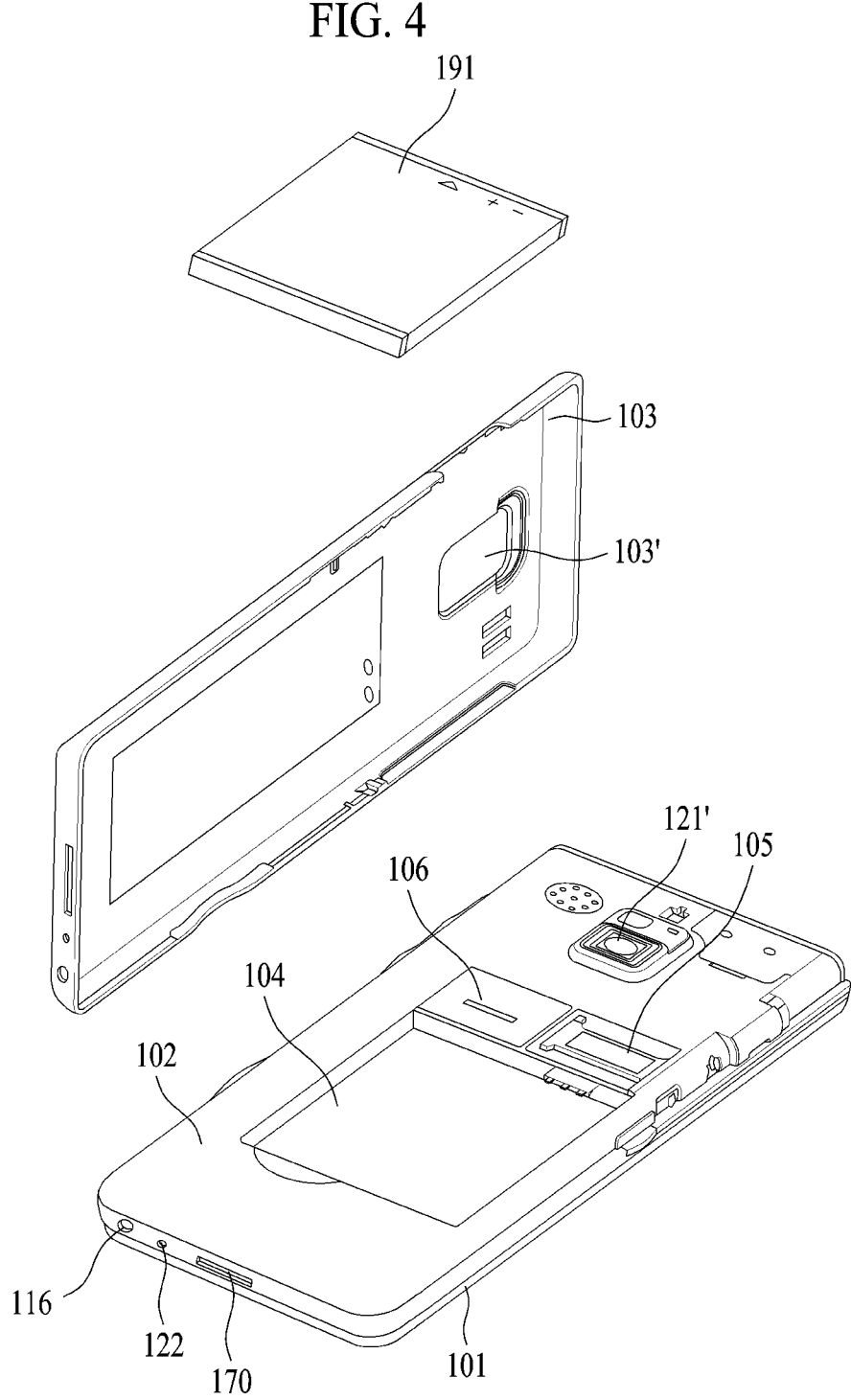
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

As mentioned in the foregoing description, a person currently taking a photo (hereinafter named a photo-taker) has difficulty in taking a photo in which the photo-taker himself is included. Therefore, a method of facilitating a synthesis of a taken photo according to one embodiment of the present invention is proposed in the following. Such an embodiment is described in detail with reference to FIG. 5 as follows.

FIGS. 5 (a) and (b) are diagrams for the concept of performing a synthesis for facilitating an inclusion of a prescribed character in taking a photo according to one embodiment of the present invention.

In order to perform a synthesis according to one embodiment of the present invention, a character template may be required. In this case, the character template means a character photo previously saved to perform the synthesis. In particular, the character template of one embodiment of the present invention may mean an image fragment for a character region after removing a background of a corresponding character for a more natural synthesis. In this case, the character region may mean an inner region inside an edge of the corresponding character.

According to one embodiment of the present invention, a character template is extracted from a previously taken photo and the extracted character template is then used for a photo synthesis.

FIG. 5 (a) shows a photo 500 previously saved in the memory 160. If a character template extraction command for a prescribed character 501 is received from a user, the controller 180 can extract a character template for the prescribed character 501 included in the previously saved photo 500. For example, the character template extraction command for the prescribed character 501 may include a touch input applied to the prescribed character 501 in the course of viewing the previously saved photo 500 through a gallery application.

In extracting the character template, the controller 180 detects (or recognizes) an edge (e.g., a boundary, an outline, etc.) of the prescribed character 501 and is then able to save an inner region inside the detected edge as the character template. Referring to FIG. 5 (a), the controller 180 extracts a $1^{st}$ character template 502-1 from the prescribed character 501 included in the previously saved photo 500.

According to an edge detection method, a part in which a rapid change occurs based on continuity of chroma, brightness and/or color may be detected as an edge. In particular, in detecting an edge of a character, an edge determination correction technique of considering a body structure as well as detecting the rapid change occurring part is used. According to one embodiment of the present invention, it is able to use the aforementioned edge detection method. As a detailed method of detecting an edge is not a core characteristic of the present invention, details of the edge detection method shall be omitted from the following description for clarity of the present specification.

The edge detection method employed by one embodiment of the present invention is non-limited by a specific method and may include various technologies known to the public.

According to one embodiment of the present invention, it is proposed to perform a synthesis in a manner that the $1^{st}$ character template 502-1 is included in a preview screen of a camera.

FIG. 5 (b) shows a preview screen 503 of a camera.

Referring to FIG. 5 (b), the $1^{st}$ character template 502-1 is synthesized with at least one or more subjects in the preview screen 503. If a shutter input 510 for taking a photo is received, the preview screen 503 synthesized with the $1^{st}$ character template 502-1 can be taken as it is. In particular, the controller 180 takes and saved a photo including the subjects displayed on the preview screen 503 in a manner that the $1^{st}$ character template 502-1 is included in the taken photo through a synthesis.

According to one embodiment of the present invention, as mentioned in the foregoing description with reference to FIG. 5 (a) and FIG. 5 (b), using a previously saved character template, a different character is synthesized with a currently taken photo and saved in a manner of being inserted in the currently taken photo.

If the extraction process shown in FIG. 5 (a) is repeated, the mobile terminal 100 can save a plurality of character templates in the memory 160. Such examples of the character template are described in detail with reference to FIG. 6 (a), FIG. 6 (b), FIG. 6 (c) and FIG. 6 (d) as follows.

FIG. 6 (a), FIG. 6 (b), FIG. 6 (c) and FIG. 6 (d) are diagrams for examples of a character template extracted from a previously saved photo according to one embodiment of the present invention.

According to one embodiment of the present invention, it is proposed to recommend an appropriate character template on a camera preview screen. Thus, in order to recommend a character template appropriately, it is necessary to determine an attribute of a character template. In this case, the attribute of the character template may include at least one of a sex, a direction faced by each character (i.e. a direction of eyes), a posture, a photographed hour and date, and the like. The attribute of the character template is described in detail with reference to FIG. 6 (a), FIG. 6 (b), FIG. 6 (c) and FIG. 6 (d) as follows.

Referring to FIG. 6 (a), a $2^{nd}$ character template 502-2 is illustrated. The $2^{nd}$ character template 502-2 is extracted from a photo taken on Sep. 15, 2013, represents a male, and the character's eyes face a left direction. And, a posture of the $2^{nd}$ character template 502 is a standing posture.

Referring to FIG. 6 (b), a $3^{rd}$ character template 502-3 is illustrated. The $3^{rd}$ character template 502-3 is extracted from a photo taken on Jul. 1, 2013, represents a female, and the character's eyes face a right direction. And, a posture of the $3^{rd}$ character template 502-3 is a standing posture.

Referring to FIG. 6 (c), a $4^{th}$ character template 502-4 is illustrated. The $4^{th}$ character template 502-4 is extracted from a photo taken on Jun. 25, 2013, represents a female, and the character's eyes face a front direction. And, a posture of the $4^{th}$ character template 502-4 is a standing posture.

Referring to FIG. 6 (d), a $5^{th}$ character template 502-5 is illustrated. The $5^{th}$ character template 502-5 is extracted from a photo taken on May 30, 2013, represents a female, and the character's eyes face a right direction. And, a posture of the $5^{th}$ character template 502-5 is a sitting posture.

According to one embodiment of the present invention, in recommending a character template which is to be synthesized with a photo, a posture appropriate for a synthesized location, on which a synthesis will be performed, is preferentially recommended. If a chair is placed at the synthesized location, it may be able to preferentially recommend a sitting character template.

According to one embodiment of the present invention, in synthesizing a character template with a photo, it is proposed to automatically adjust a size of the character template into an appropriate size. Hence, based on a size (e.g., a height, etc.) of a character currently displayed on a preview screen, it is able to appropriately adjust a size of a character template. And, it may be able to adjust the size of the character template in further consideration of a sex of the character, a sex of the character template, a normal height difference between a male and a female, and the like.

Therefore, according to one embodiment of the present invention, in saving a prescribed character template, the controller 180 saves an attribute of the corresponding character template in the memory 160 as well.

In the description of the following embodiments, assume that the character templates 502-2 to 502-5 described with reference to FIG. 6 (a), FIG. 6 (b), FIGS. 6 (c) and 6 (d) and the $1^{st}$ character template 502-1 described with reference to FIG. 5 (a) and FIG. 5 (b) are saved.

Figure 7:
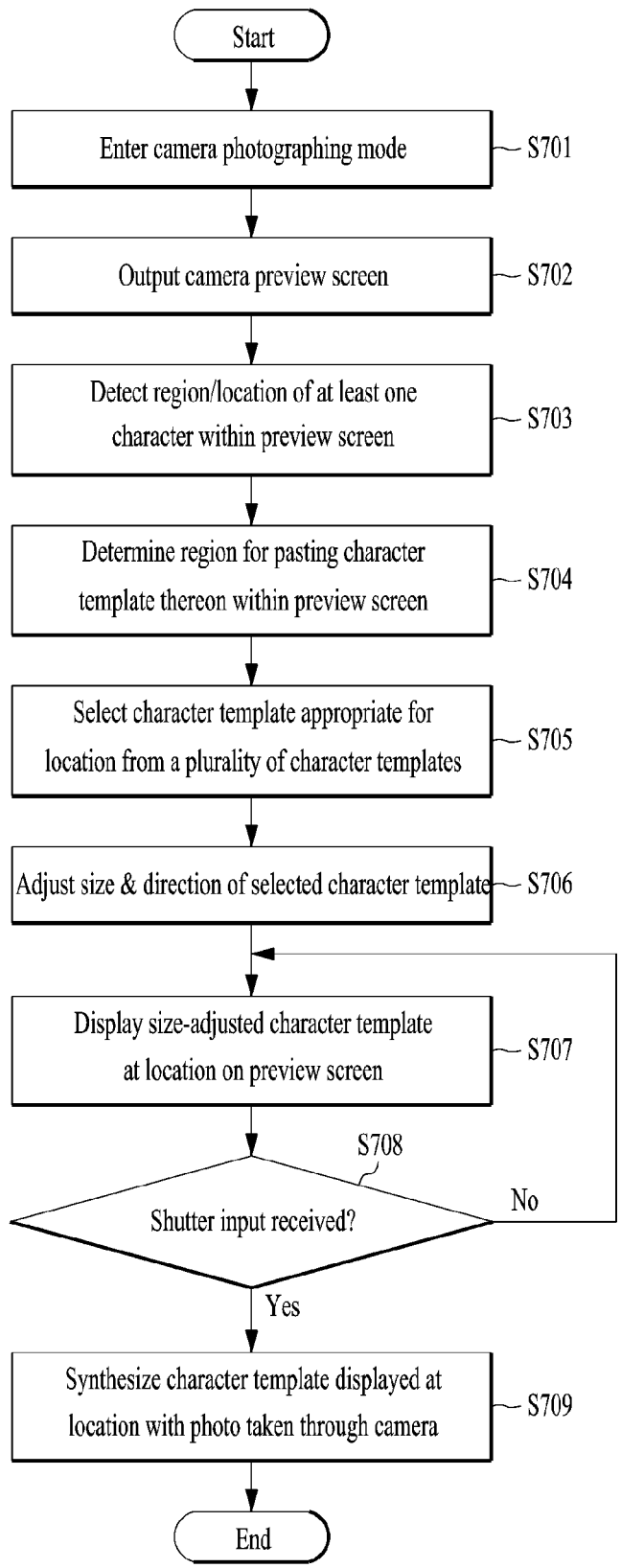
FIG. 7 is a flowchart of a controlling method of synthesizing a character template in camera photographing according to one embodiment of the present invention.

FIG. 7 is a flowchart of a controlling method of synthesizing a character template in camera photographing according to one embodiment of the present invention. And, FIG. 8 (a) and FIG. 8 (b) are diagrams for the concept of detecting a character region/location displayed on a preview screen in camera photographing according to one embodiment of the present invention.

Figure 8A:
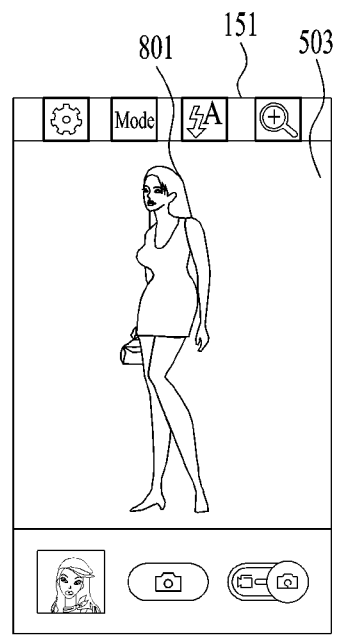
FIG. 8 (*a*) and FIG. 8 (*b*) are diagrams for the concept of detecting a character region/location displayed on a preview screen in camera photographing according to one embodiment of the present invention.
Figure 8B:
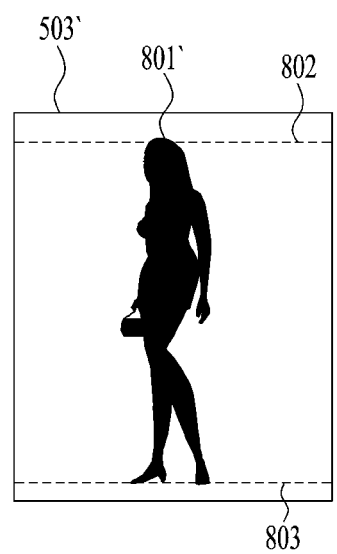

Referring to FIG. 7, FIG. 8 (a) and FIG. 8 (b), in a step S701, the controller 180 enters a camera photographing mode. In a step S702, the controller 180 can output a camera preview screen 503 through the touchscreen 151 [FIG. 8 (a)]. Referring to FIG. 8 (a), a $1^{st}$ character 801 is displayed on the preview screen 503.

In a step S703, the controller 180 detects a region/location for at least one character included in the preview screen 503. Referring to FIG. 8 (b), a $1^{st}$ character region 801' for a region (hereinafter named a preview region) 503' of a fill preview screen is illustrated. Using an edge detection method mentioned in the following description, the controller 180 may be able to detect a region/location for the $1^{st}$ character 801. Based on the detected $1^{st}$ character region 801', referring to FIG. 8 (b), the controller 180 can detect a head end position line 802 and a foot end position line 803. And, the controller 180 may determine a length (in a height direction) of the $1^{st}$ character 801 on the preview screen 503 by calculating a difference between the head end position line 802 and the foot end position line 803.

According to one embodiment of the present invention, as mentioned in the foregoing description with reference to FIG. 8 (a) and FIG. 8 (b), it is able to determine an empty space through a detection of a region/location of at least one character in a preview screen. In this case, the empty space can be recommended to a user as a location appropriate for a synthesis with a character template.

Figure 9A:
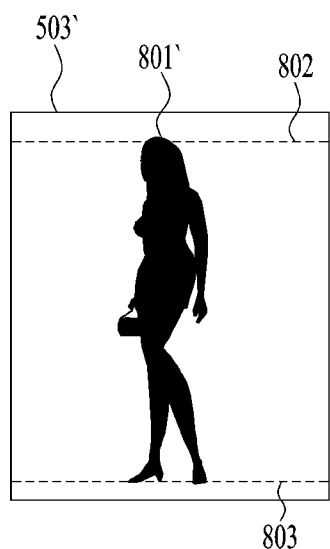
FIG. 9 (*a*) and FIG. 9 (*b*) are diagrams for a controlling method of determining an empty space on a preview screen in camera photographing according to one embodiment of the present invention.
Figure 9B:
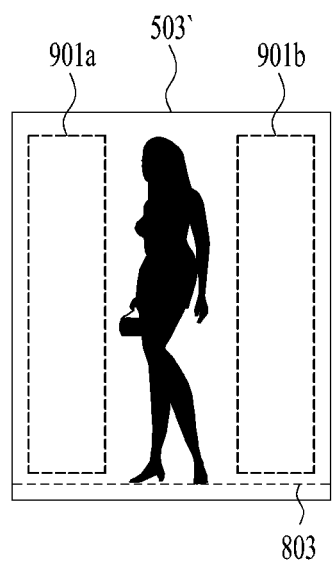

FIG. 9 (a) and FIG. 9 (b) are a diagram for a controlling method of determining an empty space on a preview screen in camera photographing according to one embodiment of the present invention.

Referring to FIG. 9 (a), the 1$^{st}$ character region 801', the head end position line 802 of the 1$^{st}$ character, and the foot end position line 803 of the 1$^{st}$ character, which are detected in the description with reference to FIG. 8 (a) and FIG. 8 (b), are illustrated together. The controller 180 selects a region (hereinafter named a paste region) appropriate for synthesizing a character template from the preview region 503' using the result of the detection and is then able to recommend and provide the selected region to a user.

Referring to FIG. 9 (b), a 1$^{st}$ paste region 901a and a 2$^{nd}$ paste region 901b are shown on a left side of the 1$^{st}$ character region 801' and a right side of the 1$^{st}$ character region 801', respectively. According to one embodiment of the present invention, the paste region can be set not to cross the foot end position line 803. The reason for this is described as follows. First of all, it is able to synthesize a character template naturally. Secondly, after the character template has been synthesized, it has to match a location of a foot end in order to look as if located on the same line of the 1$^{st}$ character 801.

According to the embodiment shown in FIG. 9 (a) and FIG. 9 (b), character templates can be synthesized on both left and right sides of the 1$^{st}$ character 801, respectively.

In continuation with the step S704, steps S705 and S706 are described with reference to FIG. 10 (a) and FIG. (b) as follows.

Figure 10:
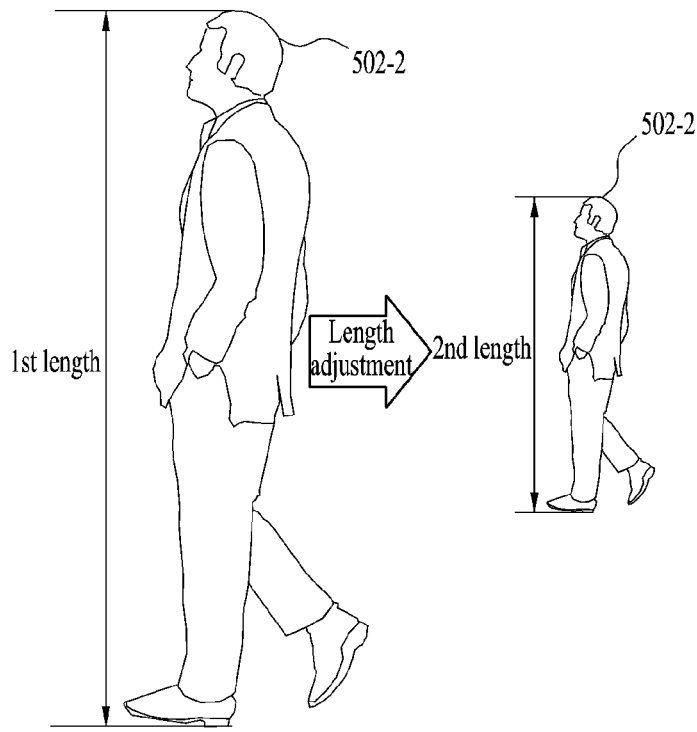
FIG. 10 (*a*) and FIG. 10 (*b*) are diagrams for a controlling method of selecting an appropriate character template and adjusting a size and direction of the selected character template according to one embodiment of the present invention.
Figure 10:
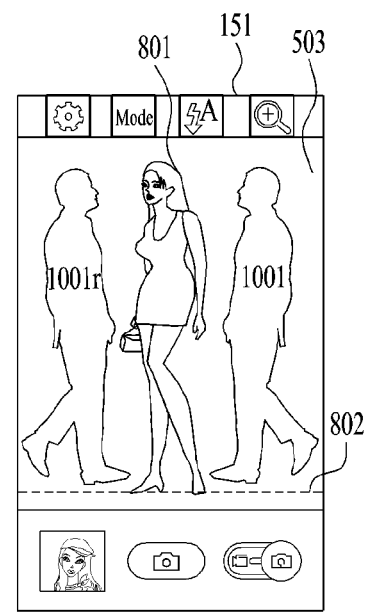

FIG. 10 (a) and FIG. (b) are diagrams for a controlling method of selecting an appropriate character template and adjusting a size and direction of the selected character template according to one embodiment of the present invention.

In a step S705, the controller 180 selects character templates appropriate for the paste regions 901a and 901b from a plurality of the character templates and is able to display the selected character templates on the preview screen 503.

According to one embodiment of the present invention, a priority of the character template selection may be determined based on an attribute of the corresponding character template.

For a 1$^{st}$ example of a priority determining method, the controller 180 may be able to use a use frequency of a character template. In particular, the controller 180 selects a most frequently used character template from character templates and then gives a top priority to the selected character template.

For a 2$^{nd}$ example of a priority determining method, the controller 180 can use a photographed hour and date (or a photographed date) of an original photo from which a character template is extracted. The reason for this is that the photographed hour and date is associated with clothes of the character template. For instance, if a character template is extracted from a photo taken in winter, it is highly possible that the clothes of the character template are suitable for cold weather. Hence, a top priority can be given to a character template extracted from an original photo of which photographed hour and date are closet to a current time.

For a 3$^{rd}$ example of a priority determining method, the controller 180 may be able to use a recently used order. The controller 180 can give a top priority to a most recently used character template among character templates.

The description with reference to FIG. 10 (a) and FIG. 10 (b) are made on the assumption that the 2$^{nd}$ character template 502-2 is selected. A user's control input for changing/switching a character template selected by the controller 180 shall be described in detail with reference to FIG. 13 (a) and FIG. 13 (b) later.

In a step S706, the controller 180 adjusts a size and direction of the character template selected in the step S705 and is then able to display the adjusted character template on the preview screen 503.

Referring to FIG. 10 (a), the controller 180 adjusts a length of the saved 2$^{nd}$ character template 502-2 into a 2$^{nd}$ length from a 1$^{st}$ length. In particular, when the length is adjusted, it is able to consider a length (in a height direction) of the 1$^{st}$ character 801 on the preview screen 503. For instance, if the length of the 1$^{st}$ character 801 is a 3$^{rd}$ length on the preview screen 503, the controller 180 can adjust the length of the 2$^{nd}$ character template 502-2 into the 3$^{rd}$ length equal to the length of the 1$^{st}$ character 801. Moreover, the controller 180 may be able to adjust the length in further consideration of a sex of the 1st character 801 and a sex of the 2$^{nd}$ character template 502-2. The reason for this is that a height of a male is normally greater than that of a female. Hence, if the height of the 1st character 801 is the 3$^{rd}$ length, the controller 180 can adjust the length of the 2$^{nd}$ character template 502-2 into a 4$^{th}$ length resulting from multiplying the 3$^{rd}$ length by a prescribed numerical value.

According to one embodiment of the present invention, it is proposed to adjust an eye direction by performing right and left symmetrical conversion of a character template based on eyes of the character template and a location of a paste region. The reason for this is that eyes of characters taken in a photo usually face a camera in taking the photo. Hence, a character template arranged on the right paste region 901b of the first character 801 naturally faces a left direction, while a character template arranged on the left paste region 901a of the first character 801 naturally faces a right direction.

Since the 2$^{nd}$ character template 502-2 synthetically arranged in FIG. 10 (a) and FIG. 10 (b) faces the left direction, if the 2$^{nd}$ character template 502-2 is arranged on the 1$^{st}$ paste region 901a, it can be adjusted to face the right direction by the right and left symmetrical conversion. If the 2$^{nd}$ character template 502-2 is arranged on the 2$^{nd}$ paste region 901b, it can be arranged without the right and left symmetrical conversion.

FIG. 10 (b) shows silhouettes 1001 and 1001r of the character template, of which size and direction are adjusted, are displayed on the 1$^{st}$ and 2$^{nd}$ paste regions 901a and 901b of the preview screen 503, respectively. The 1$^{st}$ silhouette 1001 is the silhouette on which the right and left symmetrical conversion is not performed, while the 2$^{nd}$ silhouette 1001r is the silhouette on which the right and left symmetrical conversion is performed. Since the 1$^{st}$ silhouette 1001 and the 2$^{nd}$ silhouette 1001r are arranged on the 1st paste region 901a and the 2$^{nd}$ paste region 901b, respectively, they may not cross the foot end position line 802. According to one embodiment of the present invention, as a silhouette mentioned in the following description is displayed, a user can be informed of a schematic location of a character template that will be arranged in case of performing a synthesis.

According to one embodiment of the present invention, if a user selects the displayed silhouette, it is proposed to provide a character template that is synthesized on the preview screen 503. Such an embodiment is described in detail with reference to FIG. 11 (a) and FIG. 11 (b) as follows.

Figure 11:
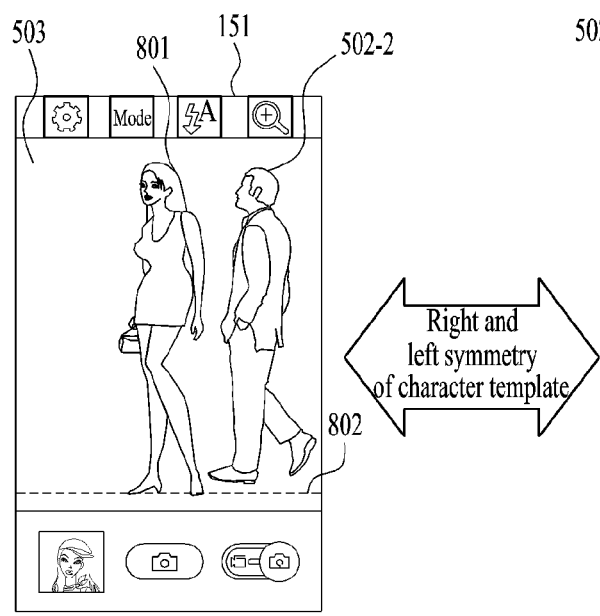
FIG. 11 (*a*) and FIG. 11 (*b*) are diagrams for a state in which a character template is synthesized and displayed on a camera preview screen according to one embodiment of the present invention.
Figure 11:
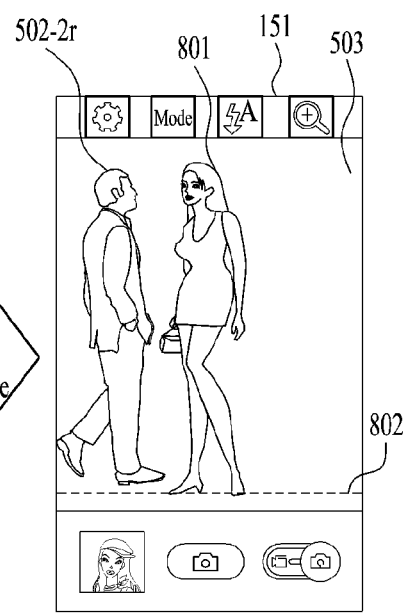

FIG. 11 (a) and FIG. (b) are diagrams for a state in which a character template is synthesized and displayed on a camera preview screen according to one embodiment of the present invention.

Referring to FIG. 11 (a), if the displayed $1^{st}$ silhouette 1001 is selected, the controller 180 can synthesize and display the $2^{nd}$ character template 502-2 at the location of the $1^{st}$ silhouette 1001.

Referring to FIG. 11 (b), if the displayed $2^{nd}$ silhouette 1001r is selected, the controller 180 can synthesize and display the $2^{nd}$ character template 502-2 at the location of the $2^{nd}$ silhouette 1001r.

Therefore, it can be observed that the synthetically displayed $2^{nd}$ character template 502-2 shown in FIG. 11 (a) is symmetric to the synthetically displayed $2^{nd}$ character template 502-2r shown in FIG. 11 (b).

According to the embodiment described with reference to FIG. 9 (a), FIG. 9 (b), FIG. 10 (a), FIG. 10 (b), FIG. 11 (a) and FIG. 11 (b), a region of a character is detected and a character template is then synthesized on the right or left region centering on the detected $1^{st}$ character 801. According to one embodiment of the present invention, a region of a thing displayed on the preview screen 503 and/or a posture of a character displayed on the preview screen 503 is further detected.

Like the region of the character, a region of a thing may use the edge detection method. Yet, it is necessary for the region of the thing to be distinguished from the region of the character. According to the face recognition technology, it is able to recognize a face using geometric factors including locations of feature points (e.g., eyes, nose, mouth, etc.) of the face, sizes of the feature points, distances between the feature points, and the like. Hence, various changes (e.g., movements of facial muscles, mouth shape, blink, etc.) of the face can be recognized by the face recognition technology. Using the face recognition technology, it is able to recognize a face of a character displayed on the preview screen 503. And, it is also able to distinguish a region of a thing and a region of a character from each other using the recognized face.

Based on the detected region of the thing and/or the detected posture of the character, it is proposed to select a paste region and a character template. Such an embodiment is described in detail with reference to FIG. 12 (a), FIG. 12 (b), FIG. 12 (c) and FIG. 12 (d) as follows.

FIG. 12 (a), FIG. 12 (b), FIG. 12 (c) and FIG. 12 (d) are diagrams for a controlling method of detecting a thing and/or a posture of a character on a preview screen and synthesizing a character template based on a result of the detection according to one embodiment of the present invention.

Referring to FIG. 12 (a), the camera preview screen 503 is displayed. And, a chair 1201, a $2^{nd}$ character 1202 and a $3^{rd}$ character 1203 are displayed on the preview screen 503. According to one embodiment of the present invention, the controller 180 can detect regions of the chair 1201, the $2^{nd}$ character 1202 and the $3^{rd}$ character 1203. In recognizing the regions, the aforementioned edge detection method and the aforementioned face recognition technology can be used.

FIG. 12 (b) shows a region for each of the regions of the chair 1201, the $2^{nd}$ character 1202 and the $3^{rd}$ character 1203 in the full preview region 503'.

According to one embodiment of the present invention, the controller 180 detects at least one paste region and is also able to select a character template to be synthesized with the determined paste region, using the result of the detection.

First of all, in determining a paste region, it is able to make the determination in consideration of a character region only without considering a region of a thing. Generally, since a character is a main subject in taking a photo, blocking a thing may not be a big issue. Yet, it is necessary for a character to avoid being blocked or overlapped as far as possible. Hence, the controller 180 may determine a left empty space of the detected $2^{nd}$ character regions 1202' and a right empty space of the detected $3^{rd}$ character region 1203' in the full preview region 503' as paste regions. Referring to FIG. 12 (b), a $3^{rd}$ paste region 901c and a $4^{th}$ paste region 901d are illustrated. In this case, if the $3^{rd}$ paste region 901c overlaps the thing region 1201', it may not cause a big problem.

According to one embodiment of the present invention, a detected region of a thing can be utilized in selecting a character template. The controller 180 recognizes that the detected thing region 1201' is a chair (or a bench) and is then able to preferentially select a siting posture of a character template for the $3^{rd}$ paste region 901c using the result of the recognition. The reason for this is described as follows. First of all, the $3^{rd}$ paste region 901c is the region that overlaps the thing region 1201'. Secondly, it is natural that the character template in a sitting posture is synthesized in the corresponding region.

In order to recognize that the thing region 1201' is the chair, the postures of the detected characters are analyzed and the result of the analysis can be used. Through the analysis of the preview screen 503, the controller 180 may be able to confirm that a posture of the $3^{rd}$ character 1203 is the siting posture. Alternatively, the controller 180 may confirm that a posture of the $3^{rd}$ character 1203 is the siting posture. Using a separate motion detection sensor (not shown in the drawing).

As the $3^{rd}$ character 1230 overlaps the thing region 1201' and if the sitting posture is confirmed as a result of the motion detection, the controller 180 may be able to recognize that the thing region 1201' corresponds to the chair. Moreover, if the thing region 1201' is recognized as the chair, the controller 180 may be able to further detect a horizontal line (hereinafter named a chair height) 1205 indicating a height of a sitting position.

Meanwhile, the method for the controller 180 to recognize that the thing is the chair is non-limited by the above description. For instance, the controller 180 may be able to recognize the chair through a screen analysis of the preview screen 503 of its own.

If the thing region 1201' is recognized as the chair, a character template in a sitting posture may be appropriate for the $3^{rd}$ paste region 901c that overlaps the thing region 1201'. Therefore, according to one embodiment of the present invention, if a prescribed thing region is a region of a perchable thing such as a chair, the controller 180 can preferentially select a character template having an attribute of a siting posture for a paste region overlapping the corresponding thing region. According to the example shown in FIG. 12 (c), since the $3^{rd}$ paste region 901c is the thing region 1201' for the chair that is a perchable thing, a sitting character template can be preferentially selected. Referring to FIG. 12 (c), a $3^{rd}$ silhouette 1206 for a $5^{th}$ character template 502-5 in a siting posture is illustrated. Moreover, a territory of the $3^{rd}$ paste region 901c may be limited to a region above the recognized chair height 1205. The reason for this is that a character template in a sitting posture can be naturally synthesized in a manner of sitting on a chair.

On the other hand, since the $4^{th}$ paste region 901*d* fails to overlap the thing region 1201', a character template in a standing posture may be preferentially selected. And, a method of determining priorities of other selections may be identical to the foregoing description with reference to FIG. 10 (*a*) and FIG. 10 (*b*). According to the example shown in FIG. 12 (*c*), the $2^{nd}$ character template 502-2 is selected as a character template having a top priority and a $4^{th}$ silhouette 1207 for the $2^{nd}$ character template 502-2 is illustrated.

If an input of selecting the $3^{rd}$ paste region 901*c* and the $4^{th}$ paste region 901*d* is received, the controller 180 can display a synthetic screen in a manner of synthesizing the $3^{rd}$ paste region 901*c* and the $4^{th}$ paste region 901*d* of the preview screen 503 with the $5^{th}$ character template 502-5 and the $2^{nd}$ character template 502-2, respectively [FIG. 12 (*d*)].

Meanwhile, according to the embodiment mentioned in the foregoing description, if a paste region is determined, the controller 180 selects and displays a most appropriate character template. On the other hand, according to another embodiment of the present invention, if a paste region is determined, it is proposed to select a character template from a plurality of character templates in response to a selection input. Such an embodiment is described in detail with reference to FIG. 13 (*a*) and FIG. 13 (*b*) as follows.

Figure 13:
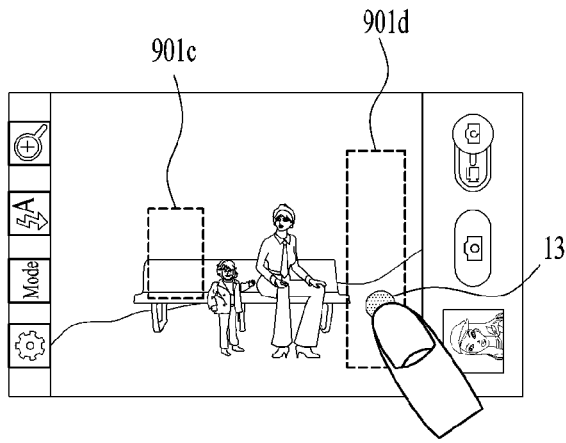
FIG. 13 (*a*) and FIG. 13 (*b*) are diagrams for a controlling method of selecting a selected character template from a plurality of character templates in response to a user's input according to one embodiment of the present invention.
Figure 13:
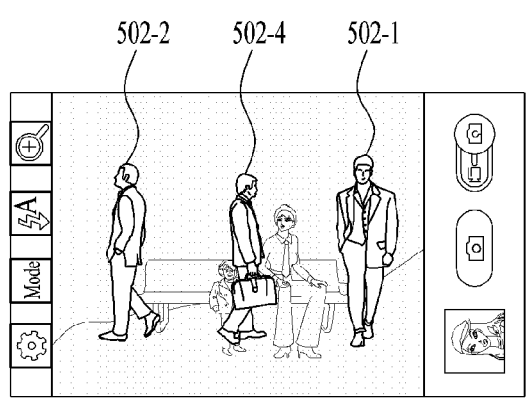

FIG. 13 (*a*) and FIG. 13 (*b*) are diagrams for a controlling method of selecting a selected character template from a plurality of character templates in response to a user's input according to one embodiment of the present invention.

Referring to FIG. 13 (*a*), like the example shown in FIG. 12, the $3^{rd}$ paste region 901*c* and the $4^{th}$ paste region 901*d* are displayed. According to one embodiment of the present invention, if an input of selecting the $4^{th}$ paste region 901*d* is received, referring to FIG. 13 (*b*), the controller 180 can display a plurality of character templates. If an input of selecting one of a plurality of the character templates is received, the controller 180 can control the selected character template to be displayed in a manner of being synthesized with the $4^{th}$ paste region 901*d*. In particular, the automatic selection process performed by the controller 180 in the embodiment described with reference to FIG. 12(*a*), FIG. 12 (*b*), FIG. 12 (*c*) and FIG. 12 (*d*) can be performed by a user selection in the embodiment described with reference to FIG. 13 (*a*) and FIG. 13 (*b*).

According to one embodiment of the present invention, a character template is synthetically included in the preview screen 503. If a shutter input 510 is received, it is able to obtain an output including the character template together with a taken photo. According to this embodiment, as a previously saved character template is repeatedly used, it is disadvantageous in that user's interest may be reduced. Therefore, according to one embodiment of the present invention, a controlling method for changing or modifying the character template is further proposed. In particular, according to one embodiment of the present invention, it is proposed to distinguish a photo taken through the front camera from a photo taken through the rear camera 121'. The rear camera 121' exists in the same direction of the display 151 and is configured to obtain the aforementioned preview screen 503. The front camera 121 exists in a direction different from that of the display 151 and is configured to take a photo of a photo-taker's face. According to one embodiment of the present invention, a following process is proposed. First of all, a face of a photo-taker is photographed. Secondly, a look of the photo-taker is extracted from the photographed face of the photo-taker. Thirdly, the extracted look of the photo-taker is then synthesized with a character template.

Such an embodiment is described in detail with reference to FIG. 14, FIG. 15 (*a*) and FIG. 15(B) as follows.

Figure 14:
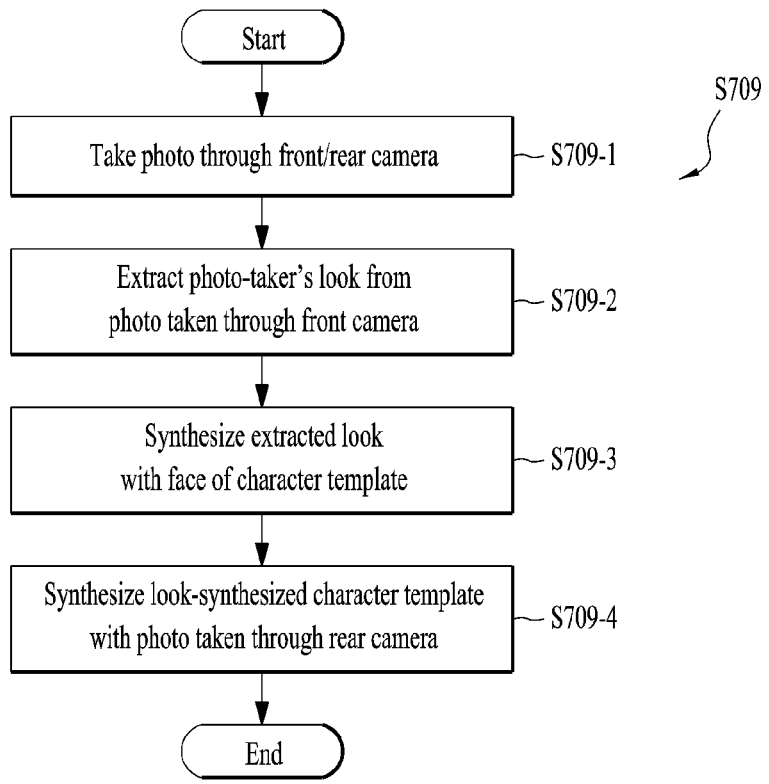
FIG. 14 is a flowchart for a controlling method of further synthesizing a character template with a face look of a photo-taker, as a sub-step of a step S709, according to one embodiment of the present invention.

FIG. 14 is a flowchart for a controlling method of further synthesizing a character template with a face look of a photo-taker, as a sub-step of a step S709, according to one embodiment of the present invention. And, FIG. 15 (*a*) and FIG. 15 (*b*) are diagrams for the concept of a controlling method of further synthesizing a character template with a face look of a photo-taker according to one embodiment of the present invention.

According to one embodiment of the present invention, a synthesis of a look may mean a process for overlaying a face region of a character template with a region (hereinafter named a face region) including eyes, nose and/or mouth. In particular, a face region of a photo-taker taken through the front camera 121 is displayed on a face region of a character template together.

According to another embodiment of the present invention, a synthesis of a look may mean a process for analyzing a face region and then changing/modifying a face region of a character template using a result of the analysis.

If any one of the above-mentioned methods is capable to changing/modifying a look of a previously saved character template, it may be applicable to one embodiment of the present invention.

Referring to FIG. 15 (*a*), a preview screen 503 of the rear camera 121' is displayed. And, a $5^{th}$ silhouette 1501 is displayed on a paste region (not shown in the drawing) together with a $4^{th}$ character. Assume that the displayed $5^{th}$ silhouette 1501 is displayed by the method described with reference to FIGS. 8 to 10. According to one embodiment of the present invention, a front preview screen 1502, which is received through the front camera 121, can be displayed on the preview screen 503 together with the preview screen 503. The front preview screen 1502 is a preview screen for obtaining a face look of a photo-taker only and may be displayed on a prescribed region of the preview screen 503 in a relatively small size.

The $1^{st}$ character template 502-1 corresponding to the $5^{th}$ silhouette is a $1^{st}$ look 1500*a* and a photo-taker's look displayed on the front preview screen 1502 shall be named a $2^{nd}$ look 1500*b*.

If a shutter input 510 is received, the controller 180 goes to a step S709-1 [S708]. In the step S709-1, the controller 180 takes a photo using both of the front camera 121 and the rear camera 121'. In a step S70902, the controller 180 recognizes a face of the photo-taker through the front camera 121 and then extracts a look of the photo-taker from the recognized face. In this case, the extraction of look may mean an operation of extracting an image of a face region from a recognized face of a photo-taker.

In a step S709-3, the controller 180 performs a look synthesis on a face of a target character template with the look extracted in the step S709-2. As mentioned in the foregoing description, the look synthesis may mean an operation of displaying the extracted look on the face region of the target character template together. Yet, in order for the extracted look to be naturally displayed on the target character template, it is apparent that separate size/brightness/chroma adjustments can be performed.

In a step S709-4, the controller 180 can display the look-synthesized character template on a photo taken through the rear camera 121' together. Referring to FIG. 15 (*b*), the look synthesis is performed on the $1^{st}$ character template 502-1 with the $2^{nd}$ look 1500b and the look-synthesized $1^{st}$ character template 502-1 can be then saved in a manner of being synthesized with the taken photo.

Thus, according to one embodiment of the present invention, although the same character template is repeatedly used, since a change of a look can be synthesized by being reflected by a character template, it is advantageous in that user's interest can be persistently maintained.

According to another embodiment of the present invention, an additional method for a more natural synthesis is proposed. When a character template is included in a taken photo in a manner of being synthesized, if the character template is synthesized to block other characters, it may be unnatural. Hence, such a synthesis is not preferable. According to one embodiment of the present invention described in the following, it is proposed to synthesize a character template in a manner of modifying the character template not to trespass on regions of characters. Such an embodiment is described in detail with reference to FIG. 16 as follows.

Figure 16:
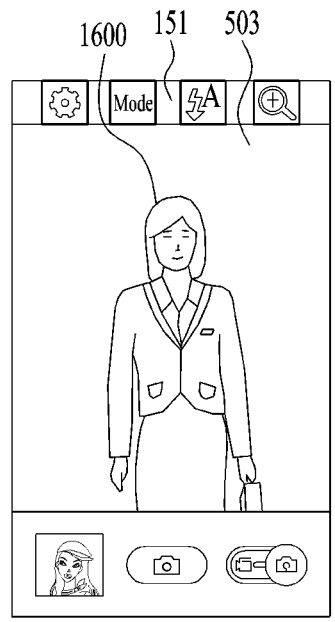
FIG. 16 (*a*), FIG. 16 (*b*), FIG. 16 (*c*) and FIG. 16 (*d*) are diagrams for a method of controlling a synthesis by modifying a synthesized character template appropriately in taking a photo according to one embodiment of the present invention.
Figure 16:
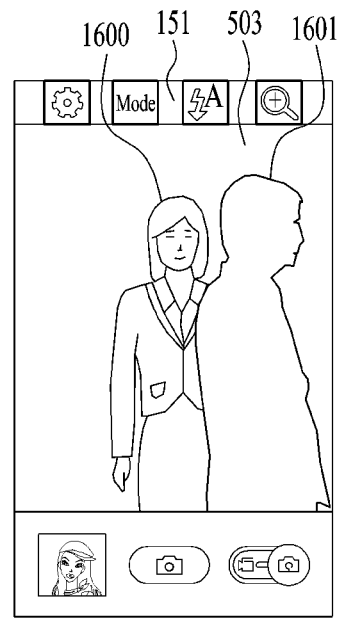
Figure 16:
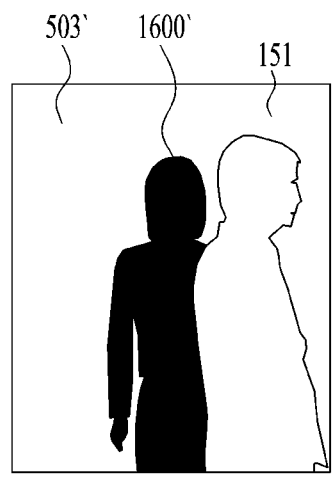
Figure 16:
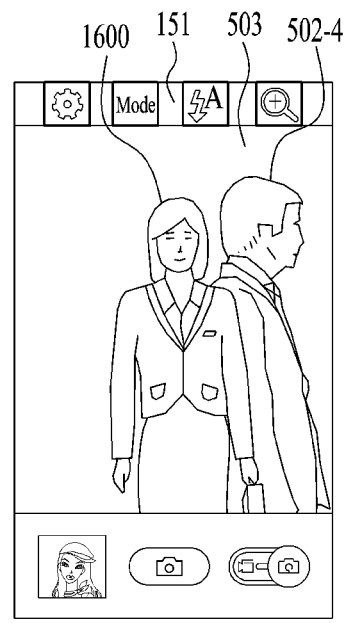

FIG. 16 (a), FIG. 16 (b), FIG. 16 (c), and FIG. 16 (d) are diagrams for a method of controlling a synthesis by modifying a synthesized character template appropriately in taking a photo according to one embodiment of the present invention.

When a character template is synthesized, if a character template synthesized on a preview screen 503 overlaps another character, it may cause a problem that a character supposed not to be blocked is blocked. Hence, when a character template is synthesized, it is proposed that a synthesis is performed in a manner that the character template avoids overlapping another character.

Referring to FIG. 16 (a), a preview screen 503 of a camera is displayed. And a $5^{th}$ character 1600 is displayed on the preview screen 503. The controller 180 detects a paste region from the preview screen 503 by one of the methods mentioned in the foregoing description and is able to display a $6^{th}$ silhouette 1601 of the $4^{th}$ character template 502-4 on the detected paste region. Looking into the $6^{th}$ silhouette 1601 shown in FIG. 16 (b), it can be observed that the $6^{th}$ silhouette 1601 partially overlaps a region on which the $5^{th}$ character 1600 is displayed.

FIG. 16 (c) shows a $5^{th}$ character region 1600' in a full preview region 503'. The $5^{th}$ character region 1600' overlaps the $6^{th}$ silhouette 1601 in part. If so, the controller 180 detects the $5^{th}$ character region 1600'. If determining that the detected $5^{th}$ character region 1600' overlaps a region of the $6^{th}$ silhouette 1601 in part, the controller 180 removes an image corresponding to the overlapping part of the $6^{th}$ silhouette 1601 from the $4^{th}$ character template 502-4 and then uses the rest of the image for the synthesis only [FIG. 16 (d)].

According to one embodiment of the present invention, when the $4^{th}$ character template 502-4 is synthesized, it is proposed to perform the synthesis in a manner of preventing the $5^{th}$ character 1600 displayed on the preview screen 503 form being blocked. If so, it can bring an effect as if a synthesized character is synthesized behind the $5^{th}$ character 1600 in a photo.

Referring to FIG. 16 (d), the $5^{th}$ character 1600 is fully displayed on the preview screen 503 without being blocked. And, it can be observed that the $4^{th}$ character template 502-4 is synthetically displayed behind the $5^{th}$ character 1600.

Accordingly, embodiments of the present invention provide various effects and/or features.

According to at least one of embodiments of the present invention, when a photo is taken using a terminal, another character (e.g., a photo-taker, etc.) can be naturally included in the taken photo in a manner of being synthesized with the corresponding photo.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display;
   a memory configured to store at least one image fragment;
   a first camera;
   a user input unit configured to receive a shutter input; and
   a controller configured to:
      cause the display to display a preview screen of an image received from the first camera;
      cause the display to display a prescribed one of the stored at least one image fragment on a prescribed region of the preview screen, wherein the prescribed one of the at least one image fragment comprises an image extracted from a region of a prescribed image, the extracted image corresponding to a first character to be shown in the prescribed region of the preview screen;
      cause the display to indicate two regions for placing the first character on the preview screen;
      perform right or left symmetrical conversion of the extracted image to be synthesized with the received image such that a symmetrically converted first character is shown in the prescribed region of the preview screen; and
      cause the memory to store a synthesized image including the received image and a symmetrically converted version of the extracted image in response to the shutter input such that the symmetrically converted first character is shown when the stored synthesized image is displayed on the display,
   wherein the two regions comprise:
      a first region for placing the first character without performing the right or left symmetrical conversion; and
      a second region for placing the first character by performing the right or left symmetrical conversion.

2. The mobile terminal of claim 1, further comprising a second camera, wherein the controller recognizes a face of a second character from an image received through the second camera and then synthesizes the recognized face of the second character with a face of the first character.

3. The mobile terminal of claim 1, wherein the controller detects an edge of a third character on the image received through the first camera and determines the prescribed region based on the detected edge of the third character.

4. The mobile terminal of claim 3, wherein the controller determines the prescribed region in a manner that the prescribed region avoids overlapping the detected edge of the third character.

5. The mobile terminal of claim 3, wherein the controller determines a height-directional length of the third character based on the detected edge of the third character and adjusts a size of the displayed one of the at least one image fragment based on the height-directional length of the third character.

6. The mobile terminal of claim 1, wherein the right or left symmetrical conversion is performed in response to selection of the second region, the second region selected while the two regions are indicated.

7. The mobile terminal of claim 1, wherein the first character placed in the first region and the first character placed in the second region are symmetrical.

8. A method of controlling a mobile terminal, the method comprising:
 displaying a preview screen of an image received from a first camera on a display;
 displaying a prescribed image fragment among at least one image fragment stored in a memory on a prescribed region of the preview screen displayed on the display, wherein the prescribed image fragment comprises an image extracted from a region of a prescribed image, the extracted image corresponding to a first character to be shown in the prescribed region of the preview screen;
 causing the display to indicate two regions for placing the first character on the preview screen;
 performing right or left symmetrical conversion of the extracted image to be synthesized with the received image such that a symmetrically converted first character is shown in the prescribed region of the preview screen; and
 causing the memory to store a synthesized image including the received image and a symmetrically converted version of the extracted image in response to a shutter input received via a user input unit such that the symmetrically converted first character is shown when the stored synthesized image is displayed on the display,
 wherein the two regions comprise:
  a first region for placing the first character without performing the right or left symmetrical conversion; and
  a second region for placing the first character by performing the right or left symmetrical conversion.

9. The method of claim 8, further comprising:
 recognizing a face of a second character from an image received through a second camera; and
 synthesizing the recognized face of the second character with a face of the first character.

10. The method of claim 8, further comprising:
 detecting an edge of a third character on the image received through the first camera; and
 determining the prescribed region based on the detected edge of the third character.

11. The method of claim 10, wherein the prescribed region is determined in a manner that the prescribed region avoids overlapping the detected edge of the third character.

12. The method of claim 10, further comprising:
 determining a height-directional length of the third character based on the detected edge of the third character; and
 adjusting a size of the displayed image fragment based on the height-directional length of the third character.

* * * * *